No. 607,153. Patented July 12, 1898.
W. J. WOODWARD.
WOODEN PIPE.
(Application filed Feb. 15, 1897.)
(No Model.)
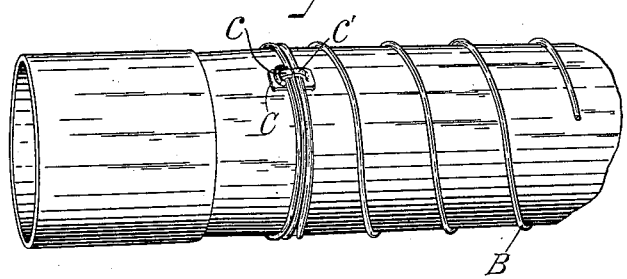
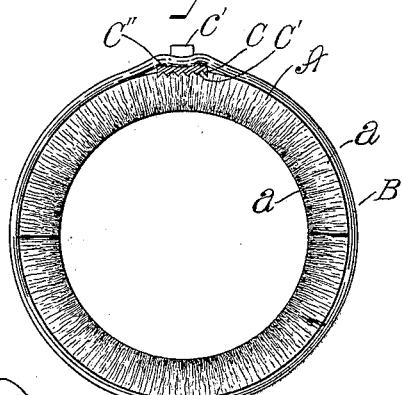
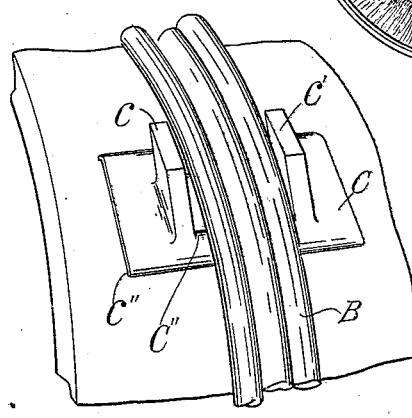
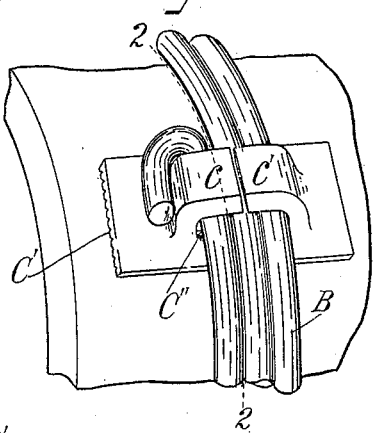
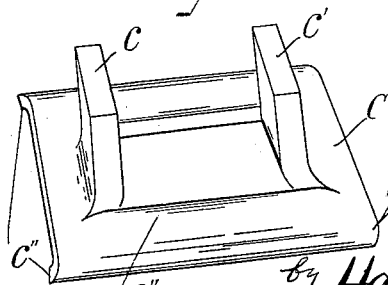
Witnesses
Perry Singman.
Alfred P. Townsend.
Inventor
Walter J. Woodward
by Hazard & Townsend
his attys
THE NORRIS PETERS CO., PHOTO-LITHO., WASHINGTON, D. C.

UNITED STATES PATENT OFFICE.

WALTER J. WOODWARD, OF NATIONAL CITY, CALIFORNIA, ASSIGNOR TO HATTIE I. WOODWARD, OF SAME PLACE, AND D. P. N. LITTLE, C. W. SANDERS, AND EMMA A. HARRINGTON, OF LOS ANGELES, CALIFORNIA.

WOODEN PIPE.

SPECIFICATION forming part of Letters Patent No. 607,153, dated July 12, 1898.

Application filed February 15, 1897. Serial No. 623,542. (No model.)

*To all whom it may concern:*

Be it known that I, WALTER J. WOODWARD, a citizen of the United States, residing at National City, in the county of San Diego and State of California, have invented new and useful Improvements in Wooden Pipes, of which the following is a specification.

In manufacturing wooden pipe it is desirable to have the pipe formed of as few sections or staves as possible in order to prevent leakage at the joints between the sections. As heretofore constructed small-sized pipes made of staves are highly unsatisfactory, for the reason that the staves must be so narrow to form the circle of the pipe and there are so many joints to be made tight it becomes practically impossible to manufacture a small stave conduit which will not leak under high pressure. Furthermore, such pipes will not stand very heavy pressure, for the reason that the staves being narrow upon the application of internal pressure they bulge or spring outward between the bands or hoops, thus causing the pipe to leak even though the joints may be perfectly formed in the first place. In many instances the staves have been made of wide thick pieces of timber cut away to form a trough-shaped stave conforming to the circle of the pipe. Such staves form a conduit of great strength; but their excessive cost precludes in most instances their practical use. It has also been common to make pipe from large pieces of timber bored to form an integral length of pipe. This pipe is very strong, but is also very expensive, especially where timber is scarce. It has also been proposed to make a pipe of boards by steaming such boards to cause them to be pliable and afterward bending them into tubular shape and securing the edges by overlapping and riveting them together. This strains the outer fibers to such an extent as to render the wood very susceptible to seepage and leakage. Furthermore, this pipe is not adapted to stand pressure, since the mode of fastening is not such as is adapted for this purpose, and the tension upon the outer fibers tends to produce rupture instead of preventing it. In endeavoring to produce pipe by bending the wood I have found that unless a tough wood having interlocking fibers, such as elm, is used it is impossible with any of the appliances heretofore in use to bend such wood without splitting the boards. The only wood which is accessible for use in southern California, where my invention is particularly adapted for use, is the California redwood, which is composed of alternate layers of hard and soft grains and which is very straight, free from blemishes, and easy to split. I have found that the only successful way of bending this wood is by clamping it upon the edges to prevent the expansion of the outer layer of the wood while the board is being bent and to compress the inner soft layers of grain upon the interior of the bent board between the impervious hard layers of grain, thus causing the inner portion of the soft layers to become practically as dense as the hard layers, thereby preventing the seepage of water therethrough.

The principal object of my invention is to produce a wooden pipe suitable for conveying water for irrigation or other purposes, one which will be practically impervious to water, so as to prevent loss from seepage, will be cheap, possess great strength, have few joints, so as to avoid as far as practical the leakage caused thereby, and which will possess great durability.

Another object of my invention is to provide an improved clip for securing the ends of the wire wrapping which is wound about the pipe to hold it in shape and strengthen it.

My invention comprises the various features of construction and combinations of parts hereinafter fully set forth and claimed.

The accompanying drawings illustrate my invention.

Figure 1 is a fragmental side view of a section of pipe embodying my invention. In this view a cast-iron collar, which is used for making connection between the ends of the sections, is shown in place upon the end of the wooden-pipe section. Fig. 2 is a sectional view of my improved pipe. The line of section is taken through one of my improved clips, showing the wires seated therein and one lug bent down over the wires. Fig. 3 is fragmental perspective view of one of my improved clips formed of sheet metal with the wires seated therein ready for the lugs to be bent down thereupon. Fig. 4 is a like view showing a cast-metal clip having the lugs bent down upon the wire and the free end of the wire bent back around one of the lugs. Fig. 5 is a perspective view of the clip shown in Fig. 3.

My improved pipe is bent by means of a peculiarly-constructed bending-machine, for which I and Henry E. Brett, in an application of even date herewith, have applied for Letters Patent of the United States. This machine is arranged to bend the boards into semicircular shape while they are clamped upon the edges, thus preventing any expansion of the outer fibers of the wood and causing a corresponding compression of the inner fibers thereof—that is to say, the layers of soft grain of the wood upon the inside of the pipe are compressed between the alternate layers of hard grain, as indicated in Fig. 2 of the drawings. This practically forms a pipe having its outer layer of fibers $a$ of the normal density of the wood used and an inner lining $a'$ of compressed wood practically impervious to water, the hard layers of grain being flinty and very dense, and the soft layers after compression being of substantially the same density as the hard layers, and therefore practically impervious to water.

My improved pipe may be formed of two sections A A', as shown in the drawings, or may be formed of three or more sections where pipe of larger diameter is used. The pipe is formed by bending the sections into shape while rendered flexible or pliable by steaming or other means, then securing them in their bent shape by clips until they become set or dried, after which the sections are placed together with their edges abutting and bound with a wrapping of wire B or any other suitable banding.

By forming the pipe of sections or staves formed of boards bent into curved shape economy of material is secured and, furthermore, each section, even when taken by itself, forms a truss of great strength, which is supported by the bands or wrappings and holds the few seams of the pipe firmly closed. By referring to Fig. 2 of the drawings it will be observed that the joints between the sections A and A' are practically supported by the entire strength of the truss—that is to say, any outward pressure at the joint is supported by the wire wrapping, which in turn is supported by the truss formed of the sections and resists the outward thrust. This resistance is so pronounced that I have subjected pipe of this character to a pressure of eighty pounds to the square inch without any leakage at the seams, although having unsupported spaces between the bandings of, say, about three and one-half inches. The compressed inner fibers expand after being wet, thus thrusting the sections firmly against the bands and closing the joint so tightly that leakage is practically impossible unless sufficient pressure is placed upon the pipe to burst the wrappings or bands.

The problem of rigidly securing the ends of the wire wrappings B of the pipe in an expeditious and effective manner is one which has proved very difficult of solution. I have illustrated in the drawings a form of clip which I have devised for this purpose and which accomplishes perfectly the ends desired. This clip comprises a base-piece C, adapted to fit upon the body of the pipe and provided with outwardly-projecting malleable lugs $c\ c'$, which are adapted to receive between them the wire wrappings and to be bent down thereupon, as shown in Fig. 4, thus to hold them firmly in position. In Figs. 2 and 4 I have shown this clip or clamp formed of malleable cast metal, having its under face C' corrugated to take into the wood of the pipe to prevent slipping. In Figs. 3 and 5 I have illustrated this clamp formed of sheet metal, having the lugs upset from the body of the metal and the outer edges of the metal turned down, as at $c''$, to take into the wood and to prevent slipping.

In practice when the pipe is wound a suitable number of turns, preferably three, it is seated upon the clip and between the lugs. While the wire is drawn taut the lugs are bent downward upon the wire, thus firmly clamping them in position. Sharp ridges C'' are provided upon the outer face of the clip, having a depression between the lugs, as shown in Fig. 2, and the wire may be bent downward in such groove, as shown in Fig. 2, before the lugs are bent down upon them. After the lugs are firmly clamped upon the wires the free end of the wire is bent back around one of the lugs, as shown in Figs. 1 and 4, and then cut off. The sharp ridges C'' take into the wire and prevent slipping.

In practical operation the pipe is made in lengths suitable for economical handling— say twenty feet, for instance—and are secured together by cast-iron couplings, as indicated in Fig. 1, or any other means desired. The ends of the sections are tapered and forced tightly into the couplings in the customary manner.

When wet, the fibers expand to some extent, and a rigid, durable, and inexpensive conduit is formed which is capable of standing heavy pressure without leakage.

Now, having described my invention, what I claim as new, and desire to secure by Letters Patent, is—

1. A wooden pipe formed of boards bent into trough shape, the outside of the pipe being of the normal density of the wood used, and the inside being compressed upon itself to form a practically non-pervious lining for the pipe.

2. A pipe formed of wooden boards having alternate layers of hard and soft grain, the grain extending through the thickness of the boards and each board being bent into curved shape while subjected to pressure upon the edges, whereby the soft grain upon the interior of the pipe is compressed between the alternate layers of hard grain, thus rendering the inner surface of the pipe of practically uniform density throughout.

3. A pipe formed of sections, each section bent into trough shape and having the inner surface compressed upon itself and its outer surface of the normal density of the wood used, the sections being arranged together with their edges abutting, and a wrapping of wire or other bands wound around the pipe.

4. In a wooden pipe, the clip set forth comprising the body or base adapted to seat upon the body of the pipe and provided on its under side with corrugations or edges to take into the wood and provided on the other side with upwardly-projecting malleable lugs arranged to receive the wrapping-wire therebetween, and adapted to be bent down upon the wire and to clamp it firmly upon the base.

5. The fastening for wooden pipes comprising a clip having a base adapted to seat upon the body of the pipe and provided with outwardly-projecting malleable lugs adapted to seat the wires therebetween; the wire wrapped around the pipe and arranged between the lugs, the lugs being bent down upon the wire and the free end of the wire being bent back around one of the lugs, substantially as set forth.

6. The clip for wooden pipes, comprising a base provided with outwardly-projecting malleable lugs adapted to have the wrapping-wires seated therebetween, and provided with sharp ridges to take into the wire, substantially as set forth.

WALTER J. WOODWARD.

Witnesses:
JAMES R. TOWNSEND,
ALFRED I. TOWNSEND.